United States Patent
Jung et al.

(10) Patent No.: US 11,514,419 B2
(45) Date of Patent: Nov. 29, 2022

(54) METHOD OF CONFIGURING OR CHANGING A CONFIGURATION OF A POS TERMINAL AND/OR ASSIGNMENT OF THE POS TERMINAL TO AN OPERATOR

(71) Applicant: Feig Electronic GmbH, Weilburg (DE)

(72) Inventors: Michael Jung, Frankfurt am Main (DE); Benjamin Tschunko, Giessen (DE)

(73) Assignee: Feig Electronic GmbH, Weilburg (DE)

( * ) Notice: Subject to any disclaimer, the term of this patent is extended or adjusted under 35 U.S.C. 154(b) by 0 days.

(21) Appl. No.: 16/018,123

(22) Filed: Jun. 26, 2018

(65) Prior Publication Data
US 2019/0005480 A1    Jan. 3, 2019

(30) Foreign Application Priority Data

Jun. 29, 2017   (EP) ..................................... 17178636

(51) Int. Cl.
*G06Q 20/20* (2012.01)
*G06F 21/10* (2013.01)
(Continued)

(52) U.S. Cl.
CPC ......... *G06Q 20/206* (2013.01); *G06F 21/105* (2013.01); *G06F 21/34* (2013.01);
(Continued)

(58) Field of Classification Search
CPC .. G06Q 20/206; G06Q 20/202; G06F 21/105; G06F 21/34; G06F 21/629; G07G 1/0009; H04L 9/0816; H04L 67/34; H04L 2209/72
See application file for complete search history.

(56) References Cited

U.S. PATENT DOCUMENTS 6,490,367 B1 * 12/2002 Carlsson ............. G06Q 20/341
382/116
7,610,631 B2   10/2009 Frank
(Continued)

FOREIGN PATENT DOCUMENTS

| EP | 1160647 A2 | 12/2001 |
|----|-----------|---------|
| NZ | 585446 | 12/2011 |
| NZ | 585446 A * | 12/2011 |

OTHER PUBLICATIONS

Summons to Attend Oral Proceedings received for the European Patent Application No. 17178636.1, dated Nov. 20, 2020, 15 pages.
(Continued)

*Primary Examiner* — Nathan C Uber
*Assistant Examiner* — Jessica E Sullivan
(74) *Attorney, Agent, or Firm* — Oblon, McClelland, Maier & Neustadt, L.L.P.

(57) ABSTRACT

A method of configuring or changing a configuration of a POS terminal by at least one operator, in which an authorization of the operator by the POS terminal is established, in which after successful authorization of the at least one operator, the at least one operator carries out the configuration or change of the configuration, in which an identification feature for identification of the at least one operator is introduced into the POS terminal, in which this identification feature is used for authorizing the at least one operator. A method of associating a POS terminal with an operator, in which the POS terminal checks the integrity of the identification feature of the operator for identification of the operator, with which the POS terminal is associated.

14 Claims, 5 Drawing Sheets

(51) Int. Cl.
  *G06F 21/34* (2013.01)
  *H04L 9/08* (2006.01)
  *G06F 21/62* (2013.01)
  *G07G 1/00* (2006.01)
  *H04L 67/00* (2022.01)

(52) U.S. Cl.
  CPC ......... *G06F 21/629* (2013.01); *G06Q 20/202* (2013.01); *G07G 1/0009* (2013.01); *H04L 9/0816* (2013.01); *H04L 67/34* (2013.01); *H04L 2209/72* (2013.01)

(56) References Cited

U.S. PATENT DOCUMENTS

| | | | |
|---|---|---|---|
| 2006/0107335 A1 | 5/2006 | Frank et al. | |
| 2008/0189774 A1* | 8/2008 | Ansari | G06F 16/64 726/7 |
| 2009/0125996 A1* | 5/2009 | Guccione | H04W 12/35 726/6 |
| 2015/0371031 A1* | 12/2015 | Ueno | G06F 21/335 726/21 |
| 2017/0317833 A1* | 11/2017 | Smith | H04L 9/3239 |

OTHER PUBLICATIONS

Chain of Trust—Wikipedia, Available Online at https://en.wikipedia.org/w/index.php?title=Chaln_of_trust&oldid=772188673, Retrieved from Internet on Dec. 11, 2020, 2 pages.

EMV Integrated Circuit Card Specifications for Payment Systems, Book 2, Security and Key Management, Version 4.3, Nov. 30, 2011, 174 pages.

Payment Card Industry (PCI), Terminal Software Security, PCI Security Standards Council, LLC, Dec. 2014.

* cited by examiner

METHOD OF CONFIGURING OR CHANGING A CONFIGURATION OF A POS TERMINAL AND/OR ASSIGNMENT OF THE POS TERMINAL TO AN OPERATOR

The invention relates to a method of configuring or changing a configuration of a POS terminal and/or assignment of a POS terminal to an operator (associating with an operator).

Operators of systems for processing cashless payment procedures provide POS terminal to retailers, which enable the verifiable authorization of transactions by customers in cooperation with further components of the system at the point of sale.

The operator bears responsibility for configuring these POS terminal such that fraud can be avoided.

One method known from practice, to guarantee the secure association of POS terminal with operators, is based on already performing the configuration of the POS terminal in a secure environment at the producer. For example, the payment application and the associated cryptographic keys are introduced by the producer in this manner at the order of the operator. The integrity of the data is exclusively ensured in this case by organizational measures.

A further method known from practice to guarantee that only changes authorized by the operator are possible on the configuration of the POS terminal is based on already integrating a feature for identification of the operator in the firmware of the POS terminal.

In one variant of this method, public keys, for example, as described in RFC 8017, can be used in this case as a feature for the identification of the operator.

In a further variant of this method, operator-specific public keys are introduced into the firmware as a feature for identification. The different configurable properties of the POS terminal, for example, a payment application and cryptographic keys, are typically associated with different public keys. The public keys in the entirety thereof represent the feature for identification of the operator.

The corresponding private keys, which are only accessible to the operator, are used to sign configurations of the POS terminal. The POS terminal checks the authorization of the configuration by means of the public keys integrated into the firmware, before the configuration change is performed.

In a further variant, an operator-specific character chain or number is introduced into the firmware as a feature for identification.

The producer of the POS terminal grants the right to the operator of performing configuration changes on POS terminal which are assigned to the operator via the identification feature. For this purpose, the producer of the POS terminal issues certificates which have the corresponding feature for identification of the operator. Moreover, the certificates contain the public key of the operator and the description of the granted right, namely the right to change specific properties of the configuration (for example, applications, cryptographic keys, or runtime parameters) of the POS terminal.

The corresponding private key, which is only accessible to the operator, is used to sign configurations of the POS terminal. The POS terminal checks authorization of the configuration as follows: firstly, the signature of the certificate is checked by means of a public key of the producer integrated into the firmware of the POS terminal. Secondly, it is checked whether the certificate grants the right of changing the configuration of a POS terminal using the corresponding feature for identification of the operator. Thirdly, the signature of the configuration is checked using the public key of the certificate. The configuration change is performed only when all three checks have been positively completed.

The technical problem on which the invention is based is to specify a method for configuring or changing a configuration of a POS terminal, which ensures that a configuration or a change of a configuration of the POS terminal can only be performed by authorized persons or institutions.

This technical problem is solved by a method having the features according to claim 1 or by a method having the features according to claim 4.

The method according to the invention for configuring or changing a configuration of a POS terminal, wherein the configuration or change of the configuration is carried out by at least one operator, is distinguished in that an identification feature for identification of the at least one operator is introduced into the POS terminal after the production and up to the first startup, this identification feature is used for authorizing the at least one operator, an authorization of the at least one operator is established by the POS terminal, and after successful authorization of the at least one operator, the at least one operator carries out the configuration or change of the configuration.

According to the invention, the identification feature is introduced into the POS terminal up to the first startup of the POS terminal. This procedure is also referred to as initialization. The identification feature can thus be introduced at an arbitrary time after the production of the POS terminal and up to the startup of the POS terminal. The identification feature does not have to already be introduced at the producer. This has the advantage that upon the replacement or the supplementation of a POS terminal, an arbitrary uninitialized POS terminal can be used, into which the identification feature is introduced as needed.

According to a further advantageous embodiment of the invention, the identification feature is introduced by the operator. This has the advantage that the operator can initialize the POS terminal such that a POS terminal already initialized by the producer does not have to be used, but rather the operator introduces the identification feature selected by him into the POS terminal and the operator can acquire an arbitrary, universally usable POS terminal from the producer.

A method for associating a POS terminal with at least one operator is distinguished in that the POS terminal checks the integrity of the identification feature of the operator to identify the operator with whom the POS terminal is associated, and the POS terminal only permits a change of a configurable property by the operator with whom the POS terminal is associated. The concept of integrity is to be understood here in the meaning of information security, wherein an unauthorized modification of the identification feature of the operator is prevented or at least recognized.

According to one advantageous embodiment of the invention, the POS terminal verifies cryptographically which operator the POS terminal is associated with. It is ensured in this way that no other party can obtain access to the POS terminal. An unauthorized third party cannot perform a change to the configuration.

According to a further advantageous embodiment of the invention, a data element which is stored in the POS terminal is used as the identification feature. The integrity of this data element has to be protected, i.e., an unauthorized change has to be prevented or at least recognized. It is advantageously provided that every operator uses a different data element in the data terminals associated with him. This means that the uniqueness of the data element is ensured. This means that different operators have to be assigned different data elements.

A further advantageous embodiment provides that a payment application is introduced during the configuration.

According to a further advantageous embodiment, the payment application is introduced into the POS terminal in the form of an executable program code. It is ensured in this way that payment procedures can be carried out. The payment application can be designed as operator-specific.

According to a further advantageous embodiment of the invention, the payment application is signed using a private key. In this way, it is ensured that a third party does not obtain access to the payment application and cannot change or configure it.

A further advantageous embodiment of the invention provides that a public key is known to the POS terminal, and a right is granted using this public key of introducing applications into the POS terminal, and the POS terminal carries out a check of the authorization before the introduction of the POS terminal, and/or a manipulation of the application is checked by the POS terminal.

In this way, it is ensured that third parties do not obtain access to the POS terminal and cannot introduce applications into the POS terminal or manipulate the POS terminal.

A further advantageous embodiment of the invention provides that cryptographic keys are configured during the configuration. Cryptographic keys are keys, the type and number of which are specific for the respective payment application, in order to ensure confidentiality, integrity, authentication, and authorization with the aid thereof during the communication between the payment application and other components of the system.

According to a further advantageous embodiment of the invention, cryptographic keys are introduced from a central body into the POS terminal. Such central bodies are equipped with corresponding rights by a certification body.

According to a further advantageous embodiment of the invention, it is provided that the cryptographic keys are introduced in a secure environment into the POS terminal, or the cryptographic keys are protected by cryptographic methods during the transmission. In the first variant, in which the keys are introduced into the POS terminal in a secure environment, the data transmission path does not have to be separately protected. In the second variant, in which the cryptographic keys are protected by cryptographic methods during the transmission, a secure environment is not required. However, the transmission path has to be protected in this case.

According to a further advantageous embodiment of the invention, it is provided that in the case of a symmetrical cryptography for transmitting cryptographic keys from the operator, an operator-specific master key is generated, the master key is stored, a device-specific master key is derived from the master key by means of a unique identifier of the POS terminal for the POS terminal, and the derived device-specific key is introduced into the POS terminal. In the case of the use of methods of symmetrical cryptography for transmitting cryptographic keys, the operator firstly generates an operator-specific master key. This master key has to be stored in a device which distributes the cryptographic key of the operator. A device-specific key is derived from this master key by means of a unique identifier of the POS terminal, for example, the serial number for the POS terminal. The derived device-specific key has to be introduced under special safety precautions into the POS terminal, which is to receive the cryptographic key of the operator.

The device which distributes the cryptographic keys of the operator can now derive the device-specific key for the POS terminal and encrypt the cryptographic key by means of this device-specific key. The cryptographic keys are thus protected on the transmission path and can only be decrypted by the POS terminal which has the matching device-specific key. By way of this method, the introduction of cryptographic keys is restricted to the POS terminal to which the master key is known.

According to a further advantageous embodiment of the invention, it is provided that a device which distributes the cryptographic keys of an operator derives the device-specific key for the POS terminal and encrypts the cryptographic keys by means of this device-specific key, the encrypted cryptographic keys are introduced into the POS terminal, subsequently the cryptographic keys are decrypted by the POS terminal using the device-specific key.

According to a further advantageous embodiment of the invention, it is provided that in the case of an asymmetrical cryptography for transmitting cryptographic keys into the device, which distributes the keys of the operator, key pairs are provided and a corresponding certificate which contains the public key, the certificate is introduced into a POS terminal and therefore the POS terminal only accepts cryptographic keys which are authorized by the device of the operator, subsequently the device of the operator introduces cryptographic keys into the POS terminal, wherein the cryptographic keys are encrypted using the public key of the POS terminal and are signed using the private key of a key pair, the cryptographic keys are decrypted by the POS terminal after the introduction into the POS terminal, which has the corresponding private key, and an authorization check is carried out by means of the public key which the device of the first operator has introduced in the first step via the corresponding certificate.

If methods of asymmetrical cryptography are used for transmitting cryptographic keys, the binding to an operator can also take place without special security precautions. One possible implementation of this method is described in the ANSI standard ASC X9 TR 34-2012. According to this method, each device which distributes the cryptographic keys of the operator has a key pair and a corresponding certificate which contains the public key. The certificate is introduced in a first step into a POS terminal. Therefore, the POS terminal only still accepts cryptographic keys which have been authorized by this device of the operator. In the following steps, the device of the operator can introduce cryptographic keys into the POS terminal by the device encrypting the cryptographic keys using the public key of the POS terminal and signing them using the private key of its own key pair. The cryptographic keys can thus only be decrypted by the POS terminal which has the corresponding private key. The authorization check takes place by means of the public key, which the device of the operator has introduced in the first step via the corresponding certificate.

According to a further advantageous embodiment of the invention, it is provided that runtime parameters are configured during the configuration.

According to a particularly advantageous embodiment of the invention, it is provided that changes of the runtime parameters for the configuration of the POS terminal only take place after successful authorization by a terminal management system.

In this case, it has to be ensured that manipulations to the runtime parameters on the transmission path to the POS terminal are recognized. If the terminal management system has a direct communication connection to the POS terminal, the communication partners can thus, for example, establish an encrypted communication connection (based on the transport layer security protocol). In the scope of the connection establishment, the terminal management system authenticates itself by means of an asymmetrical key pair and also the corresponding certificate with respect to the POS terminal, and therefore it can carry out an authorization check. To be able to carry out a successful authorization, the certificate of the terminal management system has to have the right to change the runtime parameters of the POS terminal. After successful authorization, the terminal management system can perform changes to the runtime parameters, wherein the integrity of the data can be ensured via the encrypted communication connection.

According to a further advantageous embodiment of the invention, it is provided that the terminal management system communicates with the POS terminal without direct communication connection, and changes of runtime parameters are carried out using signed data packets in a subsequent authorization check. If no direct communication connection exists between the terminal management system and the POS terminal, the change of the runtime parameters can thus take place, for example, similarly as in the case of the introduction of an application with the aid of signed data packets and corresponding authorization check.

According to a further advantageous embodiment of the invention, it is provided that to activate optional functions of the POS terminal, the operator requests a license for activation at the producer, the license for activation is granted, and the operator activates the function on at least one POS terminal.

In the case of the authorization of optional functions of the POS terminal, the operator requests a license for operating the desired function at the producer of the POS terminal.

According to an advantageous refinement of the invention, the activation takes place in the form of license keys. The producer thus grants a license for activating the function, for example, in the form of a license key, using which the operator can activate the function in one or more POS terminal. For the producer of the POS terminal, this has the advantage that he or she can activate optional functions, for example, only after payment of a license fee.

According to a further advantageous embodiment of the invention, it is provided that a hardware topology is configured during the configuration.

According to a further advantageous embodiment of the invention, it is provided that additional hardware is activated or deactivated by means of signed data packets. During the configuration of the hardware topology to assist expansion modules, the operator can connect additional hardware components to the POS terminal and control them from the POS terminal. Expansion modules which have already been provided by the producer of the POS terminal can be activated or deactivated by the operator, for example, by means of signed data packets. However, it is also conceivable that an expansion module is not provided by the producer of the POS terminal. In this case, the operator can provide the description of these new hardware components in the form of a data structure, which can be interpreted by the POS terminal. This can take place in Linux systems, for example, in the form of the "device tree". If this data structure for describing the hardware topology is additionally signed, a corresponding authorization check can be carried out by the POS terminal.

In order to ensure that only the operator or an authorized institution can carry out a change of the configuration of the POS terminal, any change to the configuration of the POS terminal is authorized by the operator. The POS terminal only performs said configuration change if it can check its authorization by the operator.

Such an authorization check requires that a feature for identification of the operator has been introduced into the POS terminal.

The invention relates, on the one hand, to a method for secure introduction of features for identification of operators into POS terminal, which has the following properties:

The uniqueness of the features for identification of different operators is ensured.

The introduction of the feature for identification of an operator can take place at an arbitrary time between the production and the startup of the affected POS terminal.

There are no security requirements for the process of the introduction of the feature for identification of an operator into a POS terminal. In particular, the identification feature can be introduced by parties other than the producer of the POS terminal.

On the other hand, the invention relates to a method for protecting and verifying the association of a POS terminal with an operator, which has the following properties:

POS terminal permit changes to any configurable property only by the operator with whom they are associated.

POS terminal ensure the integrity of the feature for identification of the operator with whom they are associated.

POS terminal can verify in a cryptographically secured manner with which operator they are associated.

According to an advantageous embodiment of the invention, the cryptographic verification of which operator the POS terminal is associated with functions as follows:

As part of the production process, the POS terminal generates a random key pair for this purpose. In a secure environment, a certificate having the following attributes is issued to the POS terminal by the producer:

As subject: identification data of the POS terminal, for example, in the form of the serial number.

As authorization: "verification of the association with an operator."

The public key of the above-mentioned key pair.

A third party who requires a verification of the operator association of a POS terminal generates, according to one advantageous embodiment, a random number and transmits it as part of the corresponding query to the POS terminal. The POS terminal forms a tuple from random number and operator feature and signs it using the private key. The POS terminal responds to the query with the operator feature, the signature, and the certificate. The third-party checks this certificate, then forms the tuple from random number and operator feature and checks the signature of this tuple using the public key from the certificate. In case of success, it is considered to be cryptographically verified that the POS terminal which is noted in the certificate as the subject is associated with the operator having the corresponding operator feature.

A feature for identification of the operator is understood in the sense of the invention to mean that the feature for identification of the operator of a POS terminal is a data element which is stored in the POS terminal. The integrity of this data element has to be protected. This means anauthorized change has to be prevented or at least recognized. The uniqueness of the data element has to be ensured. This means different operators have to be assigned different data elements.

Examples for the format of the data element are:
an ASCII coded and zero-terminated character chain (for example, "SuperPay GmbH"),
a number (for example, "242"),
one or more public keys of an asymmetrical cryptographic method.

The configuration of the POS terminal which is under control of the operator advantageously comprises the following properties:

a) the payment application itself (also "sequence controller"), which is typically introduced in the form of an executable program code and which implements the specific sequence of the transaction authorization and the integration with other components of the system,
b) cryptographic keys, the type and number of which are specific for the respective payment application and with the aid of which confidentiality, integrity, authentication, and authorization are ensured during the communication between the payment application and other components of the system,
c) runtime parameters of the POS terminal, which establish, for example, the local time of day, network settings, EMV® parameters, or parameters of the payment application and are generally managed by a terminal management system,
d) the licensing of optional functions by the producer of the POS terminal by the producer providing licenses for activating functions (such as an EMV® contactless C-3 kernel) to an operator, by which the operator can activate the corresponding functions in the POS terminal,
e) the configuration of the hardware topology to assist expansion modules for controlling additional hardware components.

A processing unit for open payment systems functions, for example, by means of certified kernel, as described in the documents "EMV® Contactless Specifications for Payment Systems", book A, Architecture and General Requirements, version 2.6, March 2016, book B, entry point specification, version 2.6, July 2016, book C-1, kernel 1 specification, version 2.6, February 2016, book C-2, kernel 2 specification, version 2.6, February 2016, book C-2, kernel 3 specification, version 2.6, February 2016, book C-4, kernel 4 specification, version 2.6, February 2016, book C-5, kernel 5 specification, version 2.6, February 2016, book C-6, kernel 6 specification, version 2.6, February 2016, book C-7, kernel 7 specification, version 2.6, February 2016, book D, EMV® contactless communication protocol specification, version 2.6, March 2016 (EMV®—registered trademark of the EMV® Co, LLC, USA).

In the method according to the invention, asymmetrical cryptography methods and digital signatures and also symmetrical cryptography methods can be used.

Asymmetrical cryptography is distinguished by the use of key pairs, of each of which one key is made publicly accessible, while the other key is private and is only known to its owner. Items of information which are encrypted using the private key can only be decrypted using the public key.

This property is used to create and check digital signatures. A document is signed by the owner of the private key by encrypting a cryptographic checksum of the document using the private key and appending the signature resulting therefrom to the document.

Under the assumption that the public key of the signatory is known to the receiver of the signed document, the receiver can check the signature by decrypting the signature using the public key of the signatory and comparing the results of the cryptographic checksum of the document. If these correspond and it is given that the private key is actually only known to the signatory, this signature thus doubtlessly originates from the signatory.

Examples of methods of asymmetrical cryptography are the RSA method and elliptical curve cryptography with the respective signature methods thereof.

RSA (Rivest, Shamir, and Adleman) is an asymmetrical cryptographic method which can be used both for encryption and also for digital signing. It uses a key pair, consisting of a private key which is used for the decryption or signing of data, and the public key, using which encryption is performed or signatures are checked. The private key is kept secret and according to the present status can only be computed with an extremely high level of effort from the public key.

To be able to check a digital signature and authenticate the signatory, the following preconditions have to be provided:
The public key itself has to be known.
It has to be known with signatory the public key is to be associated. That is to say, which subject (for example, a technical device or a legal or natural person) has sole access to the corresponding private key.

The linkage of these two items of information can be established in a digital certificate. After checking the correctness of the specifications, the certificate itself is digitally signed by a trustworthy certification body.

Via an indirection step, the receiver of a digitally signed document can check the signature as follows, if the public key of the certification body is known to him: The certificate of the supposed signatory is checked using the public key of the certification body. In case of success, the signature of the document is subsequently checked using the public key from the certificate.

If this check is also successful, the signature can thus be associated with the subject specified in the certificate.

The advantage which results from this indirection step is that only the public key of the certification body has to be known to the receiver of signed documents to be able to check digital signatures of all signatories for which this body has issued certificates.

This chain can be continued by issuing certificates for trustworthy certification bodies. This chain of trust finally ends at a trust anchor, represented by the public key of a trustworthy certification body superior to all of these. Such a hierarchy of certification bodies is referred to as a public key infrastructure.

A widespread format for digital certificates is defined in the ITU-T Standard X.509. A widespread public key infrastructure is the Internet PKI (Public Key infrastructure) defined in IETF RFC 5280 for authenticating communication users in the Internet.

Authentication is the verification of an asserted property of an entity, which can be, for example, a human, a device, a document, or an item of information, and which carries out its authentication by its contribution in this case.

In information technology, authentication is either the procedure of authorization checking or the result of this check. Authentication means the checking of the authenticity. The term authentication is also used for the attestation of authenticity.

The authentication of an entity with respect to the asserted property of the authenticity, which can be, for example, granting of an "existing access authorization" or "authenticity", enables further actions for the authenticated entity. The entity is then considered to be authentic.

The confirmation terminating an authentication is also referred to as authorization if it is restricted by specific permissible modes and/or in a specific context. An authentication applies until the relevant context is left or changed or until the relevant mode is left or changed.

In addition to authentication, digital certificates are also used for authorization, i.e., for granting rights to the relevant subject. For this purpose, a description of the granted rights is stored in the certificate in a syntax which is well-defined within the respective area of application (i.e., within the validity of the public key infrastructure). If the signed document contains, for example, a request to exercise a specific right, it is thus checked on the basis of the certificate whether the corresponding right has been granted to the requesting subject by the certification body.

The configuration of a POS terminal comprises different properties of a POS terminal which can be changed by the operator.

The introduction of applications which are typically provided in the form of an executable program code can only take place after successful authorization. Moreover, a manipulation of the application on the transmission path to the POS terminal has to be recognized. This can be ensured, for example, in that the applications are signed using a private key. If the corresponding public key is known to the POS terminal and the right is granted to this key of introducing applications into the POS terminal, the POS terminal can thus carry out an authorization check before the introduction of the application. Moreover, a manipulation of the application by third parties can be recognized using this method.

The distribution of cryptographic keys for the respective payment application can take place in various ways. Since the introduction of cryptographic keys by a service employee is costly and susceptible to error, cryptographic keys are distributed to POS terminal from a central body. For this purpose, the cryptographic keys either have to be introduced into the POS terminal in a secure environment or have to be protected on the transmission path by suitable cryptographic methods, so that they are not known to third parties.

Upon use of methods of symmetrical cryptography for transmitting cryptographic keys, the operator firstly generates an operator-specific master key. This master key has to be stored in a device which distributes the cryptographic keys of the operator. A device-specific key is derived for the POS terminal from this master key by means of a unique identifier of the POS terminal (for example, the serial number). The derived device-specific key has to be introduced under special safety precautions into the POS terminal which is to receive the cryptographic keys of the operator. The device which distributes the cryptographic keys of the operator can now derive the device-specific key for the POS terminal and encrypt the cryptographic keys by means of this device-specific key. The cryptographic keys are thus protected on the transmission path and can only be decrypted by the POS terminal which has the matching device-specific key. By way of this method, the introduction of cryptographic keys is restricted to the operator to whom the master key is known.

During the activation of optional functions of the POS terminal, the operator advantageously requests a license for activating the desired function at the producer of the POS terminal. The producer grants a license to activate the function, for example, in the form of a license key, using which the operator can activate the function in one or more POS terminal. For the producer of the POS terminal, this has the advantage that the producer can only activate optional functions, for example, after payment of a license fee.

The invention claims for protection a method for associating POS terminal with an operator by means of a feature for identification of different operators. The method does not place any security requirements on the process of introduction, and therefore it can be carried out by trustworthy bodies other than the producer up to the time of the startup.

The features for identification of the different operators are managed by a central and trustworthy certification body (for example, the producer of the terminal), which represents the so-called trust anchor. This body assigns an individual feature to each operator. This feature for identification of the operator is stored as an expansion in a digital certificate which is signed by the certification body. The operator is the owner of the secret key, the public key of which is contained in the digital certificate, and therefore as the possessor of this feature, it can authenticate itself for identification by means of the private key. The trustworthy certification body therefore authorizes an operator to perform changes on the configuration of a POS terminal, and ensures at the same time that no other operator can thereupon perform changes on the configuration of the POS terminal. Moreover, the description of the granted right for changing specific properties of the configuration (for example, applications, cryptographic keys, or runtime parameters) is stored in a certificate, and therefore the operator can use different keys for different configurable properties.

The trustworthy certification body can also operate and authorize further certification bodies to manage rights for changing individual configurable properties separately.

In a further embodiment of the invention, indirection steps may be introduced by the trustworthy certification body authorizing further trustworthy bodies (for example, system integrators) to manage a subset of features for identification of the different operators. These can in turn authorize further trustworthy bodies to manage a partial set of their subset of features, and therefore a hierarchical tree structure arises. To depict this structure in the feature for identification of different operators, for example, the format of an object identifier (4.36.13) can be used. In this case, the first number describes the trustworthy certification body. The second body describes the authorized body located underneath (for example, the system integrator) and is managed by the trustworthy certification body. The last number describes the operator and is managed by the authorized body located above it (for example, the system integrator).

The trustworthy certification body can also enable the authorized bodies (for example, the system integrators) to operate several of their own bodies, in which each of these trustworthy bodies in turn manage rights for changing different configurable properties. The certificate of these trustworthy bodies thus includes, in addition to the features for identification of the operator, also the granted rights (for example, for introducing applications or cryptographic keys), which this body manages.

In order to ensure the introduction of the feature for identification of different operators from a trustworthy certification body, a trust anchor has to be provided in the POS terminal, represented by the public key of the certification body, which is introduced, for example, in the scope of the production by the producer of the POS terminal. After the introduction of the trust anchor, the introduction of the feature for identification of the operator can take place in the scope of the startup, wherein the POS terminal has to check the chain of trust from the certificate, which contains the feature for identification of the operator, up to the trust anchor. For this purpose, the complete certificate chain up to the trust anchor has to be provided to the POS terminal at the time of the introduction of the feature for identification of the operator. The POS terminal can thus ensure that the feature was given by the trustworthy certification body, an authorized operator was identified, and it was not manipulated on the path to the POS terminal. After the introduction of the feature, it is permanently stored as the identifier of the authorized operator, whereby the POS terminal is associated with the operator.

In a further embodiment of the invention, the trust anchor may also be introduced into the POS terminal in the scope of the startup jointly with the feature for identification of the operator. The trust anchor, represented by the public key of the certification body, can also be supplied during the introduction of the feature for identification of the operator, in addition to the certificate chain, for example, in the form of a certificate. In this case, the POS terminal permanently stores the certificate or the public key of the trustworthy certification body as a trust anchor and uses it for all further authorization checks.

Since the feature for identification of different operators is already cryptographically protected from manipulation via the digital signature of the certificate, no additional safety requirements have to be placed on the process of introduction.

To protect the configuration of the POS terminal from manipulation, methods are required which permit the introduction of these data exclusively by an authorized operator. Moreover, different operators are to be prevented from being able to perform changes on the various configurable properties of the POS terminal (for example, introduction of applications, cryptographic keys, or change of runtime parameters). This is achieved by introduction of the feature for identification of an operator, by permitting any change of a configurable property of the POS terminal exclusively by an operator as soon the POS terminal is associated with this operator via the feature for identification. This operator has to authenticate themselves as the owner of this feature in relation to the POS terminal upon each subsequent configuration change of the POS terminal. Changes of the configuration by other operators are rejected by the POS terminal because of a lack of authorization.

In this method, the binding of the POS terminal to an operator takes place, represented by the operator feature. In contrast thereto, the binding of the POS terminal takes place, in the method described in ANSI standard ASC X9 TR 34-2012 for introducing cryptographic keys, to an individual device of the operator, which distributes cryptographic keys. If this device fails, the POS terminal thus has to be bound to another device of the operator. The method described here offers the advantage that the trustworthy certification body can authorize a further device of the operator in the event of failure of a device, without a change of the POS terminal being required. Moreover, for example, the operator can operate multiple devices for distributing cryptographic keys at different locations.

A further advantage of the invention is that any change of a configurable property requires an authorization of the operator, which includes a check of the operator feature. It is thus possible to prevent an operator A from introducing, for example, the payment application and another operator B from introducing the cryptographic keys.

In a further advantageous embodiment of the invention, the feature for identification of the operator may be introduced jointly with the initial configuration of the POS terminal. In this case, in addition to the initial configuration of the POS terminal, the certificate which contains the feature for identification of the operator, and also the certificate chain up to the trust anchor are also supplied. The POS terminal firstly introduces the feature for identification of the operator in consideration of all authorization checks and is thereupon associated with the corresponding operator. Subsequently, the POS terminal carries out the configuration in consideration of the corresponding authorization checks. This enables the operator to integrate the feature into already existing processes, for example, the initial introduction of the payment application or cryptographic keys.

Figure 1:
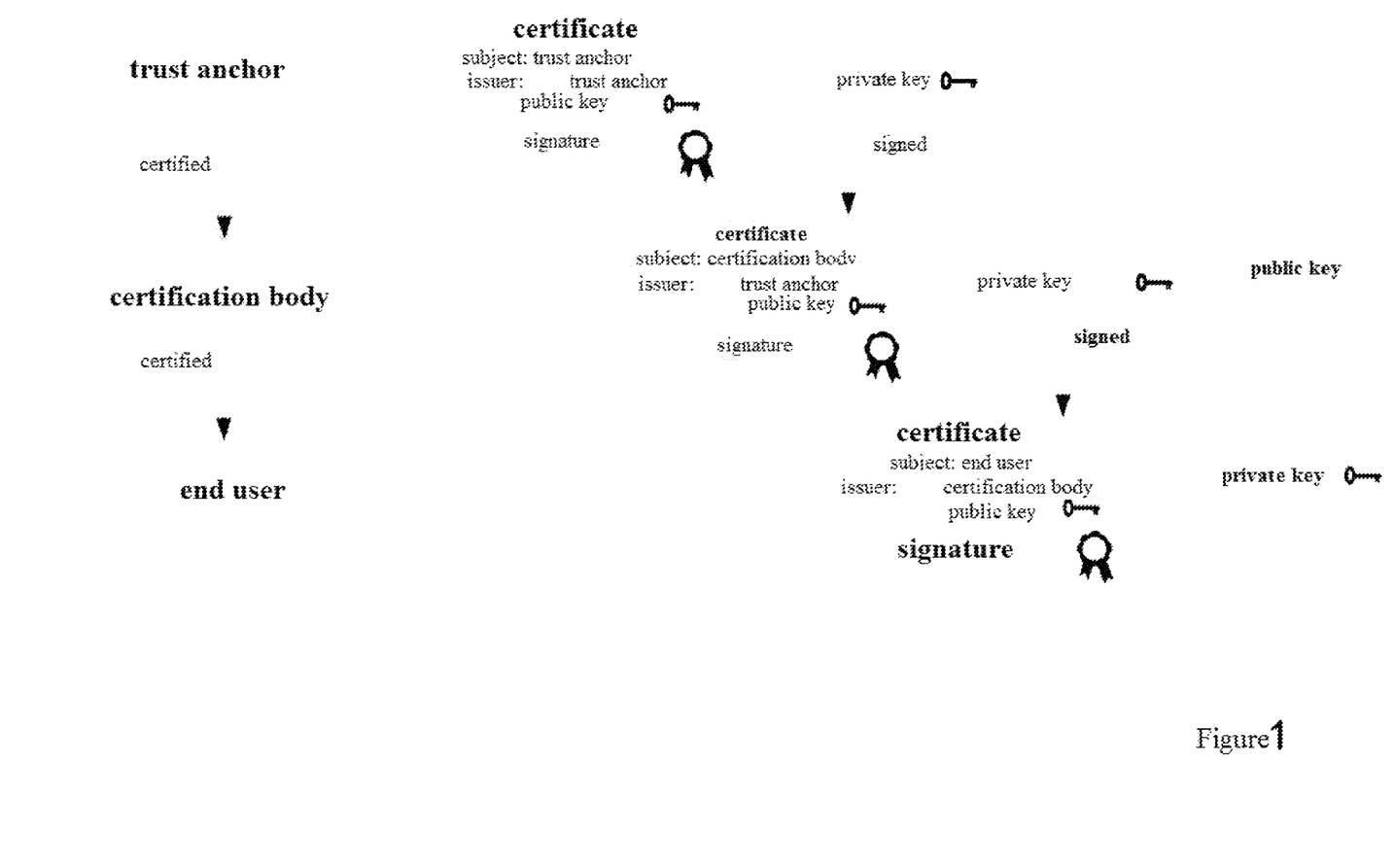
FIG. 1 shows an overview of a structure of digital certificates and public key infrastructures.

Further features and advantages of the invention result on the basis of the associated drawings, in which various embodiments of a configuration according to the invention are shown only by way of example, without restricting the invention to these exemplary embodiments. In the figures of the drawings:

FIG. 1 shows the use of digital certificates and public key infrastructures. To be able to check a digital signature and authenticate the signatory, the following preconditions have to be provided:

The public key itself has to be known.

It has to be known with which signatory the public key is to be associated. This means which subject (for example, a technical device or a legal or natural person) has sole access to the corresponding private key.

The linkage of these two items of information can be established in a digital certificate. After checking the correctness of the specifications, the certificate itself is digitally signed by a trustworthy certification body.

The receiver of a digitally signed document can check the signature via an indirection step as follows, if the public key of the certification body is known to him: The certificate of the supposed signatory is checked using the public key of the certification body. In case of success, the signature of the document is subsequently checked using the public key from the certificate.

If this check is also successful, the signature can thus be associated with the subject specified in the certificate.

The advantage which results from this indirection step is that only the public key of the certification body has to be known to the receiver of signed documents in order to be able to check digital signatures for all signatories for which this body has issued certificates.

This chain can be extended by issuing certificates for trustworthy certification bodies. This chain of trust finally ends at a trust anchor, represented by the public key of the trustworthy certification body superior to all of these. Such a hierarchy of certification bodies is referred to as a public key infrastructure.

A widespread format for digital certificates is defined in the ITU-T standard X.509. A widespread public key infrastructure (PKI) is the Internet PKI defined in IETF RFC 5280 for authenticating communication users in the Internet.

Figure 2:
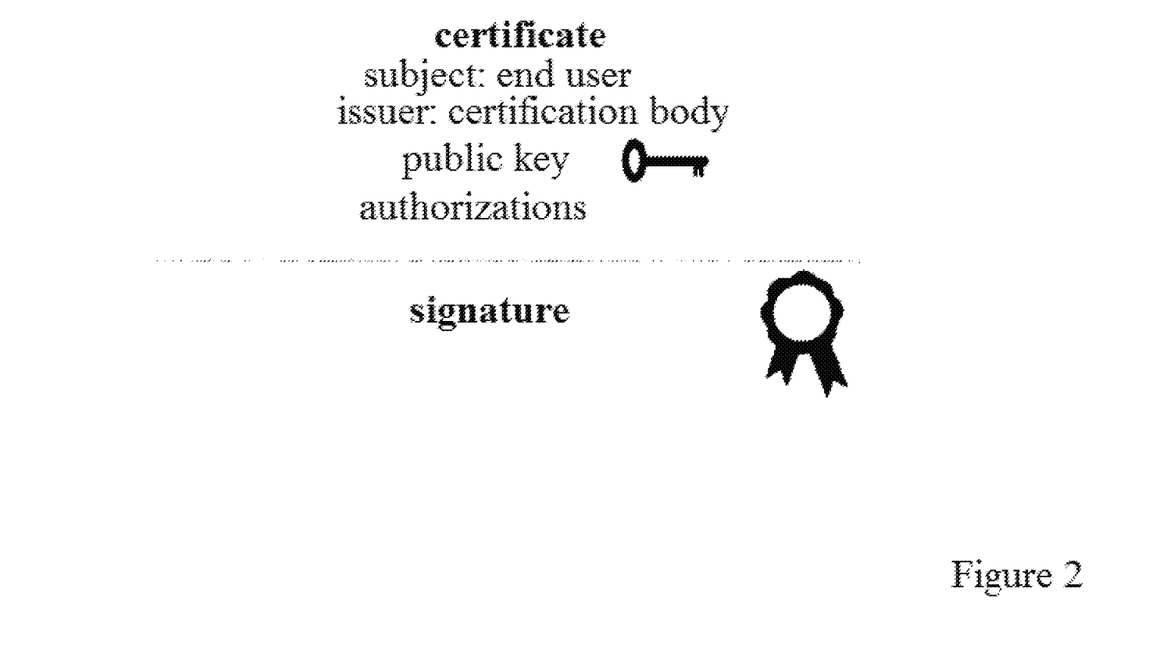
FIG. 2 shows an illustration of a certificate.

As shown in FIG. 2, digital certificates can also be used for authorization, i.e., for granting rights to the affected subject, in addition to the authentication. For this purpose, a description of the granted rights is stored in the certificate in a syntax which is well defined within the respective area of application (that is, within the validity of the public key infrastructure). If the signed document contains, for example, a request to exercise a specific right, it is thus checked on the basis of the certificate whether the corresponding right has been granted to the requesting subject by the certification body.

Figure 3:
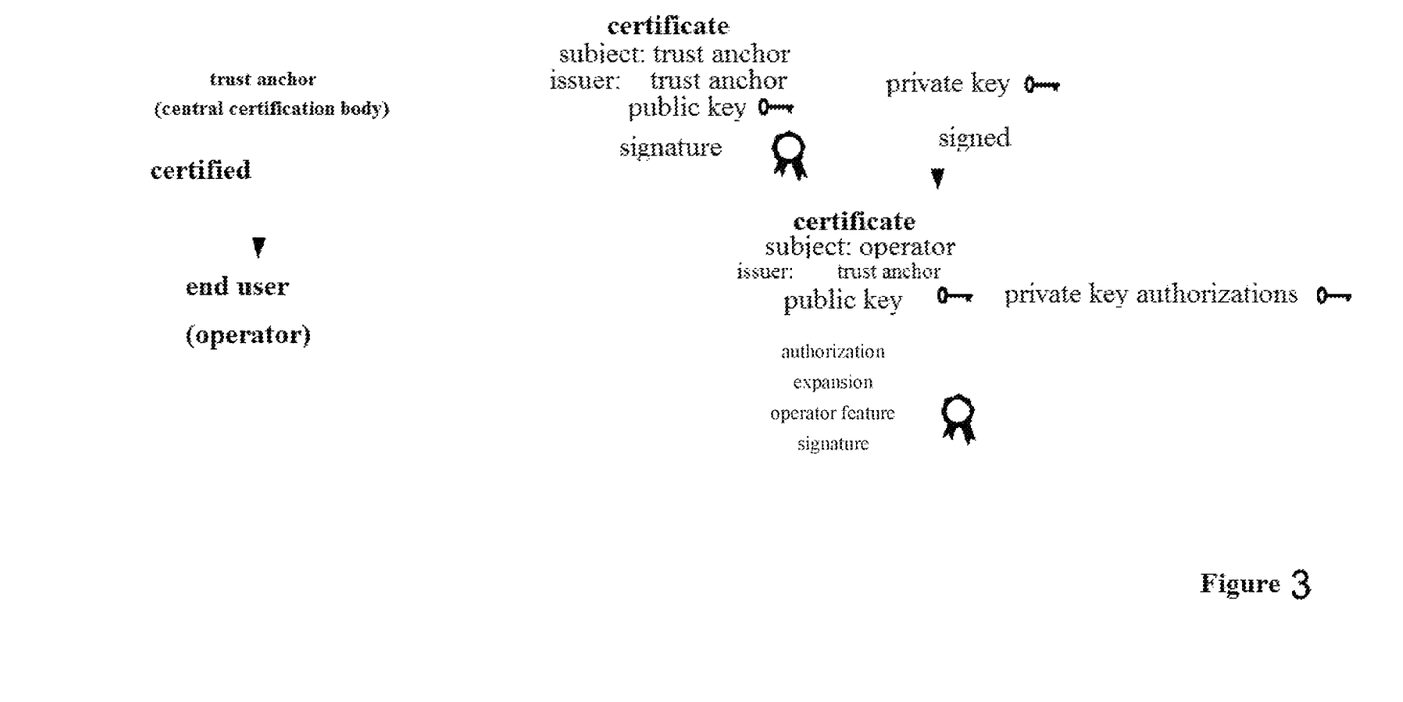
FIG. 3 shows an overview of the management of a feature for identification of different operators.

FIG. 3 shows the management of a feature for identification of different operators.

The features for identification of the different operators are managed by a central and trustworthy certification body (for example, the producer of the terminal), which represents the so-called trust anchor. This body allocates an individual feature to each operator. This feature for identification of the operator is stored as an expansion in a digital certificate, which is signed by the certification body. The operator is the owner of the private key, the public key of which is contained in the digital certificate, and therefore they can also identify themselves as the possessor of the feature for identification by means of the private key. Therefore, the trustworthy certification body authorizes an operator to perform changes on the configuration of a POS terminal, and ensures simultaneously that no other operator can thereupon perform changes on the configuration of the POS terminal. Moreover, the description of the granted rights for changing specific properties of the configuration (for example, applications, cryptographic keys, or runtime parameters) is stored in a certificate, and therefore the operator can use different keys for different configurable properties.

Figure 4:
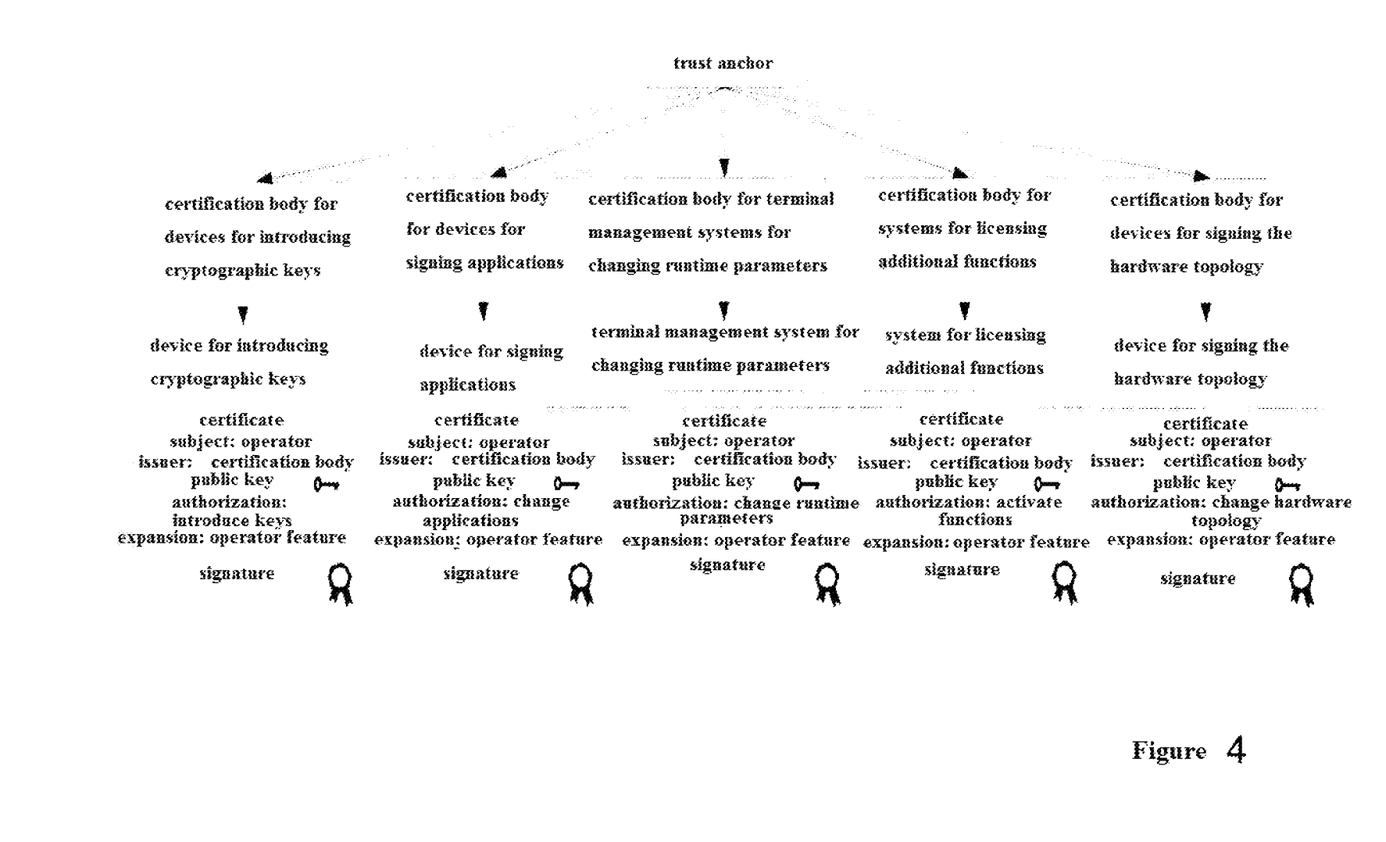
FIG. 4 shows an overview of various certification bodies.

FIG. 4 shows a further embodiment of the invention.

The trustworthy certification body can also operate and authorize further certification bodies to manage rights for changing individual configurable properties separately.

In a further embodiment of the invention, indirection steps may be introduced by the trustworthy certification body authorizing further trustworthy bodies (for example, system integrators), to manage a subset of features for identification of the different operators. These can in turn authorize further trustworthy bodies to manage a partial set of their subset of features, and therefore a hierarchical tree structure arises. To depict this structure in the feature for identification of different operators, for example, the format of an object identifier (4.36.13) can be used. In this case, the first number describes the trustworthy certification body. The second number describes the authorized body located underneath (for example, the system integrator) and is managed by the trustworthy certification body. The last number describes the operator and is managed by the authorized body located above it (for example, the system integrator).

The trustworthy certification body can also enable the authorized bodies (for example, the system integrators) to operate several of their own bodies, in which each of these trustworthy bodies in turn manage rights for changing different configurable properties. The certificate of these trustworthy bodies thus includes, in addition to the features for identification of the operator, also the granted rights (for example, for introducing applications or cryptographic keys), which this body manages.

Figure 5:
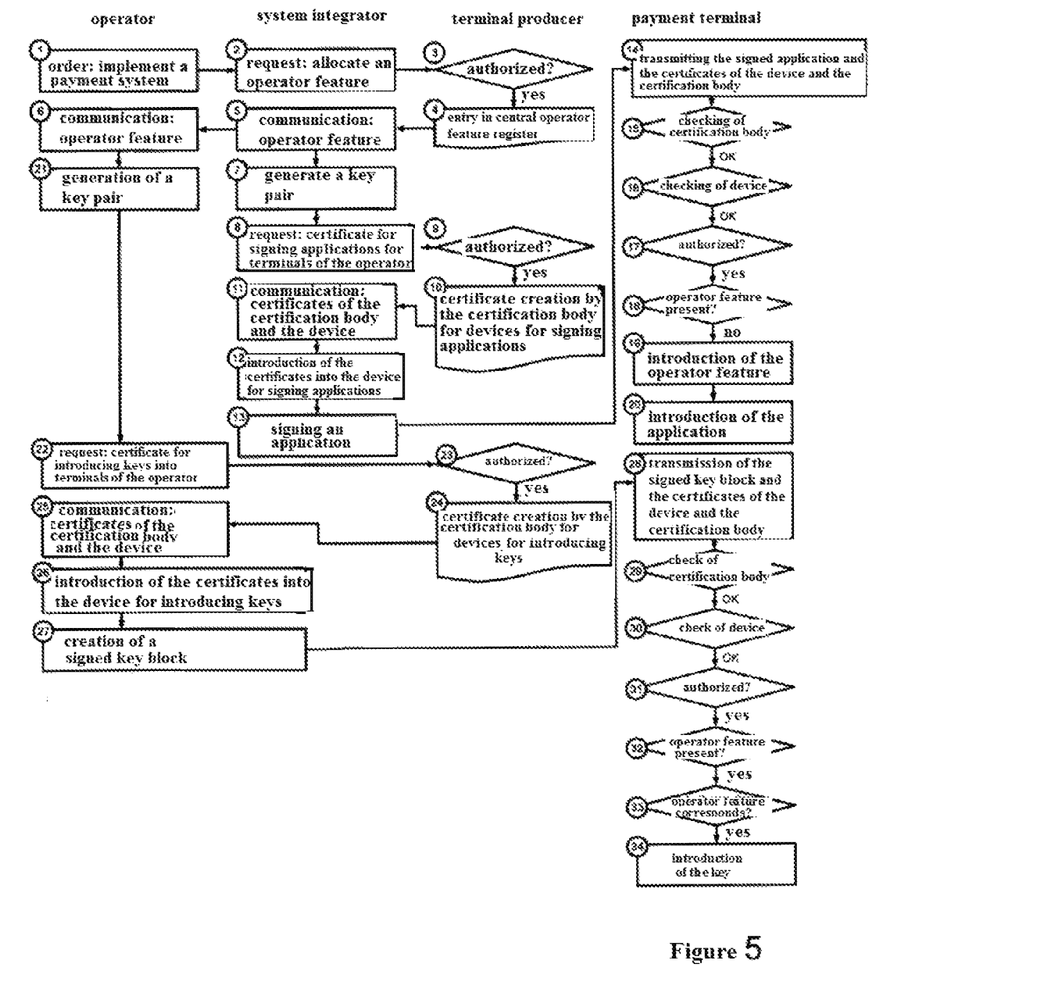
FIG. 5 shows a flow chart for the introduction of an operator feature.

FIG. 5 shows an example, in which a POS terminal is associated with an operator at the time of the startup.

The operator of a system for processing cashless payment procedures (referred to as payment system in short hereafter), a system integrator, which implements the payment system on order of the operator, the terminal producer, who supplies the POS terminal to the system integrator, and such a POS terminal are participating in this example.

The operator orders the system integrator to implement a payment system, which is to be operated in future by said operator.

The system integrator decides to integrate POS terminal of the terminal producer in the implementation of the payment system. He orders a new operator feature for the operator with the terminal producer.

The terminal producer checks by telephone conversation with the operator whether the system integrator is authorized to request an operator feature in the name of the operator. According to the present example, this is the case.

The terminal producer generates a new unique operator feature and introduces it together with the contact data of the operator and the system integrator into a centrally controlled register of allocated operator features.

The terminal producer communicates the allocated operator feature to the system integrator.

The system integrator communicates the operator feature to the operator.

The system integrator generates a key pair and exports the public key in a secure device for signing applications.

The system integrator orders, at the terminal producer, the issuance of a certificate having the following attributes:
  as the subject: identification data of the system integrator;
  as the authorization: "change applications";
  the allocated operator feature;
  said public key of the device for signing applications.

The terminal producer checks by telephone conversation with the operator whether the system integrator is to be authorized to introduce applications into POS terminal of the operator. In the present example, this is the case.

In his role as certification body for devices for signing applications, the terminal producer issues the ordered certificate having the following attributes:
  as the publisher: identification data of the certification body;
  as the subject: identification data of the system integrator;
  as the authorization: "change applications";
  the operator feature of the operator;
  the public key of the device for signing applications;
  a signature about the mentioned attributes, which was prepared by means of the private key of the certification body.

The issued certificate and the certificate of the certification body for devices for signing applications are transferred by the terminal producer to the system integrator.

The system integrator imports the two certificates into the device for signing applications.

The system integrator signs the payment application, which is to be installed on the POS terminal to implement the payment system, using the device for signing applications.

In this example, the system integrator has a stock of POS terminal new from the factory of the terminal producer in his warehouse. He takes a POS terminal out of the warehouse, integrated into the payment system and imports the following files:
  the certificate of the certification body for devices for signing applications;
  the certificate of the device for signing applications;
  the signed application.

The POS terminal starts the process for introducing or updating applications. Firstly, it checks the signature of the certificate of the certification body using the public key of the trust anchor, which is present in integrity-protected form in the POS terminal. In the present example, this check is successful.

The POS terminal checks the signature of the certificate of the device for signing applications using the public key from the certificate of the certification body. In the present example, this check is successful.

The POS terminal checks whether the certificate of the device for signing applications has the authorization "change applications". In the present example, this check is successful.

The POS terminal checks whether it is already bound to an operator. That is to say, whether an operator feature has already been introduced. Since it is a POS terminal new from the factory, this is not the case in the present example.

The POS terminal extracts the operator feature from the certificate of the device for signing applications and introduces it into an integrity-protected nonvolatile memory. The POS terminal is bound to the operator by this procedure.

The POS terminal checks the signature of the application using the public key from the certificate of the device for signing applications. In the present example, this check is successful. The POS terminal installs the application.

The operator generates a key pair and exports the public key in a secure device for introducing cryptographic keys.

The operator orders, with the terminal producer, the issuance of a certificate having the following attributes:
- as the subject: identification data of the operator;
- as the authorization: "introduce keys";
- the allocated operator feature;
- said public key of the device for introducing cryptographic keys.

The terminal producer checks on the basis of the central register whether the operator feature from the certificate order is associated with the operator. In the present example, this is the case.

In his role as the certification body for devices for introducing cryptographic keys, the terminal producer issues the ordered certificate having the following attributes:
- as the publisher: identification data of the certification body;
- as the subject: identification data of the operator;
- as the operation: "introduce keys";
- the operator feature of the operator;
- the public key of the device for introducing cryptographic keys;
- a signature about the mentioned attributes which was created by means of the private key of the certification body.

The issued certificate and the certificate of the certification body for devices for introducing cryptographic keys are transferred from the terminal producer to the operator.

The operator imports the two certificates into the device for introducing cryptographic keys.

The operator signs a key block, which is to be installed on the POS terminal for confidential communication between operator and POS terminal, using the device for introducing cryptographic keys.

The operator transfers the following files to the POS terminal:
- the certificate of the certification body for devices for introducing cryptographic keys;
- the certificate of the device for introducing cryptographic keys;
- the signed key block.

The POS terminal starts the process for introducing cryptographic keys. Firstly, it checks the signature of the certificate of the certification body using the public key of the trust anchor, which is provided in integrity-protected form in the POS terminal. In the present example, this check is successful.

The POS terminal checks the signature of the certificate of the device for introducing cryptographic keys using the public key from the certificate of the certification body. In the present example, this check is successful.

The POS terminal checks whether the certificate of the device for introducing cryptographic keys has the authorization "introduce keys". In the present example, this check is successful.

The POS terminal checks whether it is already bound to an operator. That is to say, whether an operator feature has already been introduced. At this point of the example, this is the case.

The POS terminal extracts the operator feature from the certificate of the device for introducing cryptographic keys. It checks whether the operator feature corresponds to the already introduced operator feature. In the present example, this is the case.

The POS terminal checks the signature of the key block using the public key from the certificate of the device for introducing cryptographic keys. In the present example, this check is successful.

The POS terminal imports the cryptographic key. The POS terminal is therefore put into operation.

The invention claimed is:

1. A method of configuring a POS terminal in a payment system via electronic communication with an operator device, the method comprising:
identifying, at the POS terminal, whether the POS terminal is already bound to an operator device by checking whether an operator identifier corresponding to one of a plurality of operator devices has already been introduced to the POS terminal, wherein the operator identifier is a unique data element corresponding to a specific one of the plurality of operators in the payment system, the operator identifier for identification of the operator device being introduced into the POS terminal by the operator device after the production of, and up to commissioning the PCS terminal into service in the payment system;
determining, at the POS terminal, whether a chain of trust of a public-key infrastructure is complete from a digital certificate which contains the operator identifier for identification of the operator device up to a trust anchor, wherein a complete certificate chain up to the trust anchor is provided to the POS terminal at a time of the introduction of the operator identifier; such that the POS terminal ensures that (i) the operator identifier was given by a trustworthy certification body, (ii) an authorized operator device was identified, and (iii) the digital certificate was not manipulated during electronic transfer to the POS terminal;
extracting, at the POS terminal, the operator identifier from a digital certificate of a signing device for signing applications and permanently storing the operator identifier in an integrity-protected-non-volatile memory so that the POS terminal is hound to the operator device, wherein the operator identifier is stored as tin expansion in a digital certificate which is signed by the certification body, such that the POS terminal is associated with the authorized operator device, the operator identifier authorizes the operator device, and an authorization of the operator device is established by the POS terminal wherein after successful authorization of the operator device, the POS terminal performs the configuration;

transferring cryptographic keys during an asymmetrical cryptography from an operator device that distributes cryptographic keys, wherein cryptographic keys and a corresponding digital certificate of the operator device for introducing cryptographic keys are transmitted to the POS terminal;

verifying, at the POS terminal, that the chain of trust from the digital certificate which contains the operator identifier for identification of the operator device up to a trust anchor is complete;

extracting, at the POS terminal, the operator identifies, from the digital certificate of the operator device for introducing cryptographic keys, and verifying whether the operator identifier corresponds to the operator identifier previously introduced to the POS terminal;

rejecting the configuration in an instance in which the operator identifier corresponds to another of the plurality of operator devices, wherein the POS terminal only permits a change of a configurable property by the operator device with which the POS terminal is associated;

accepting, at the POS terminal, only cryptographic keys which are authorized by the operator device for introducing cryptographic keys and, introducing the cryptographic keys from the operator device into the POS terminal, the cryptographic keys being encrypted by the operator device using the public key of the POS terminal and signed using a private key; and the cryptographic keys are decrypted by the POS terminal after their introduction into the POS terminal which has a corresponding private key; and activating optional functions of the POS terminal, wherein using a license for activation is granted using a producer device to activate the optional functions of the POS terminal.

2. The method of claim 1, wherein the operator device initializes a POS terminal which is uninitialized by a producer of the POS terminal.

3. The method of claim 1, wherein the POS terminal verifies cryptographically with which operator device the POS terminal is associated.

4. The method of claim 1, wherein a payment application is configured during the configuration.

5. The method of claim 1, wherein the payment application is signed using a private key.

6. The method of claim 1, wherein a public key is known to the POS terminal, and a right is granted using this public key to introduce applications into the POS terminal, and the POS terminal carries out a check of the authorization before the introduction of the application, and/or a manipulation of the application is checked by the POS terminal.

7. The method of claim 1, wherein runtime parameters are configured during the configuration.

8. The method of claim 7, wherein changes of the runtime parameters for the configuration of the POS terminal take place only after successful authorization by a terminal management system.

9. The method of claim 1, wherein a terminal management system communicates with the POS terminal via a direct communication connection, and the terminal management system establishes an encrypted communication connection to the POS terminal, and the terminal management system authenticates itself with the POS terminal by means of an asymmetrical key pair and a corresponding digital certificate, and the POS terminal carries out an authorization check, and upon authorization, a change of runtime parameters is performed.

10. The method of claim 1, wherein a terminal management system communicates with the POS terminal without a direct communication connection, and changes of runtime parameters are carried out using signed data packets and a subsequent authorization cheek.

11. The method of claim 1, wherein the activation takes place in the form of license keys.

12. The method of claim 1, wherein a hardware topology is configured during the configuration.

13. The method of claim 1, wherein to verify an operator device association with a POS terminal, a random number is generated and transmitted to the POS terminal, and the POS terminal forms a topic from a random number and the operator identifier and signs the tuple using the private key, wherein the POS terminal responds with the operator identifier, the signature and the digital certificate, and subsequently the digital certificate is checked, the tuple of the random number and operator identifier is formed, and the signature of the tuple is checked using the public key from the digital certificate.

14. A method of changing a configuration of a POS terminal that was initially configured in accordance with claim 1, the method comprising:

verifying, at the POS terminal, that an operator identifier corresponding to one of a plurality of operator devices has already been introduced to the POS terminal;

determining, at the processor of the POS terminal, whether a chain of trust of a public-key infrastructure is complete from a digital certificate for a change of configuration which contains the operator identifier for identification of the operator device up to a trust anchor, wherein a complete certificate chant up to the trust anchor is provided to the POS terminal at a time of the introduction of the operator identifier, such that the POS terminal ensures that (i) the operator identifier was given by the trustworthy certification body, GO an authorized operator device was identified, and (iii) the digital certificate was not manipulated during electronic transfer to the POS terminal, extracting, at the POS terminal, the operator identifier from a digital certificate of a signing device for signing applications including configuration data, and verifying whether the operator identifier corresponds to the previously introduced operator identifier which authorizes the operator device, wherein after successful authorization of the operator device, the POS terminal performs the change of the configuration;

transferring cryptographic keys associated with the change of configuration during an asymmetrical cryptography from an operator device that distributes cryptographic keys, wherein cryptographic keys and a corresponding digital certificate of the operator device for introducing cryptographic keys are transmitted to the POS terminal;

verifying, at the POS terminal, that the chain of trust from the digital certificate for the change of configuration which contains the operator identifier for identification of the operator device up to a trust anchor, is complete;

extracting, at the POS terminal, the operator identifier from the digital certificate for the change of configuration, and upon verifying that the operator identifier corresponds to the previously introduced operator identifier, introducing the cryptographic keys into the POS terminal.

\* \* \* \* \*